United States Patent
Brückner et al.

(10) Patent No.: US 10,487,696 B2
(45) Date of Patent: Nov. 26, 2019

(54) METHOD FOR THE FLEXIBLE OPERATION OF A POWER PLANT

(71) Applicant: SIEMENS AKTIENGESELLSCHAFT, München (DE)

(72) Inventors: Jan Brückner, Uttenreuth (DE); Gerhard Schlund, Dormitz (DE); Frank Thomas, Erlangen (DE); Bernd Weissenberger, Erlangen (DE)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 14/433,712

(22) PCT Filed: Oct. 2, 2013

(86) PCT No.: PCT/EP2013/070510
§ 371 (c)(1),
(2) Date: Apr. 6, 2015

(87) PCT Pub. No.: WO2014/056772
PCT Pub. Date: Apr. 17, 2014

(65) Prior Publication Data
US 2015/0275704 A1    Oct. 1, 2015

(30) Foreign Application Priority Data
Oct. 11, 2012    (DE) .................. 10 2012 218 542

(51) Int. Cl.
*F22B 1/00*    (2006.01)
*F22B 29/06*    (2006.01)
(Continued)

(52) U.S. Cl.
CPC .......... *F01K 23/101* (2013.01); *F01K 23/105* (2013.01); *F22B 1/1807* (2013.01);
(Continued)

(58) Field of Classification Search
CPC ........ F22B 1/18; F22B 1/1807; F22B 1/1861; F22B 35/08; F22B 35/083; F22B 35/10; F22B 35/107; F22B 29/06; F22B 1/00
(Continued)

(56) References Cited

U.S. PATENT DOCUMENTS 3,134,368 A  *  5/1964  De Vincent ............. F22B 29/06
                                                      122/451 S
3,192,908 A     7/1965  Schroedter
(Continued)

FOREIGN PATENT DOCUMENTS

CN    101469617 A    7/2009
CN    101988697 A    3/2011
(Continued)

OTHER PUBLICATIONS

International Search Report for PCT Application No. PCT/EP2013/070510, dated Feb. 13, 2014; 6 pages.
(Continued)

*Primary Examiner* — Deming Wan
(74) *Attorney, Agent, or Firm* — Schmeiser, Olsen & Watts, LLP

(57) ABSTRACT

A method for flexibly operating a nuclear power plant with a waste heat steam generator that operates according to the forced-flow principle and that has heating surfaces of different stages of the waste heat steam generator, the heating surfaces being arranged in the flue gas channel, is provided. In order to increase the output, a mass flow of the feedwater flowing through the heating surfaces is increased while almost simultaneously activating a supplementary firing arranged in the flue gas channel of the waste heat steam generator.

8 Claims, 1 Drawing Sheet

(51) Int. Cl.
  *F01K 23/10* (2006.01)
  *F22B 1/18* (2006.01)
  *F22B 35/08* (2006.01)
  *F22B 35/10* (2006.01)

(52) U.S. Cl.
  CPC ............ *F22B 1/1861* (2013.01); *F22B 35/08* (2013.01); *F22B 35/083* (2013.01); *F22B 35/107* (2013.01); *Y02E 20/16* (2013.01)

(58) Field of Classification Search
  USPC .......................................... 60/652; 122/406.4
  See application file for complete search history.

(56) References Cited

U.S. PATENT DOCUMENTS

| | | | | |
|---|---|---|---|---|
| 3,818,699 | A * | 6/1974 | Pritchard | F22G 5/12 60/665 |
| 3,980,100 | A | 9/1976 | Gasparoli | |
| 4,182,275 | A * | 1/1980 | Gibson | F22B 1/1861 122/336 |
| 5,799,481 | A * | 9/1998 | Fetescu | F01K 17/025 60/39.182 |
| 6,442,924 | B1 | 9/2002 | Talley et al. | |
| 8,915,217 | B2 * | 12/2014 | Rop | F22B 1/18 122/406.4 |
| 2004/0149239 | A1 * | 8/2004 | Franke | F02C 6/18 122/406.4 |
| 2004/0261729 | A1 * | 12/2004 | Sarkar | F22B 31/00 122/459 |
| 2005/0235825 | A1 | 10/2005 | Tin et al. | |
| 2006/0075977 | A1 * | 4/2006 | Franke | F22B 1/1815 122/406.4 |
| 2011/0006529 | A1 * | 1/2011 | Rose | F01K 3/245 290/52 |
| 2011/0099972 | A1 | 5/2011 | Yang et al. | |
| 2011/0139094 | A1 | 6/2011 | Bruckner et al. | |
| 2011/0156385 | A1 | 6/2011 | Teodoriu et al. | |

FOREIGN PATENT DOCUMENTS

| | | |
|---|---|---|
| DE | 10155508 A1 | 8/2002 |
| DE | 10115131 A1 | 10/2002 |
| DE | 102004020753 A1 | 12/2005 |
| DE | 102010060064 A1 | 5/2011 |
| EP | 1050667 A1 | 11/2000 |
| EP | 1050677 A2 | 11/2000 |
| EP | 1164254 A2 | 12/2001 |
| EP | 2194320 A1 | 6/2010 |
| JP | S5985404 A | 5/1984 |
| JP | S63172803 A | 7/1988 |
| JP | H01159501 A | 6/1989 |
| JP | H07083005 A | 3/1995 |
| JP | 2007183068 A | 7/2007 |
| JP | 2008082583 A | 4/2008 |
| WO | WO 02101205 A1 | 12/2002 |
| WO | WO 2009150055 A2 | 12/2009 |

OTHER PUBLICATIONS

Notice of Allowance for JP Application No. 2015-536068, dated Dec. 26, 2016.
Korean Office Action for application No. 10-2015-7009093 dated Jul. 12, 2019.

* cited by examiner

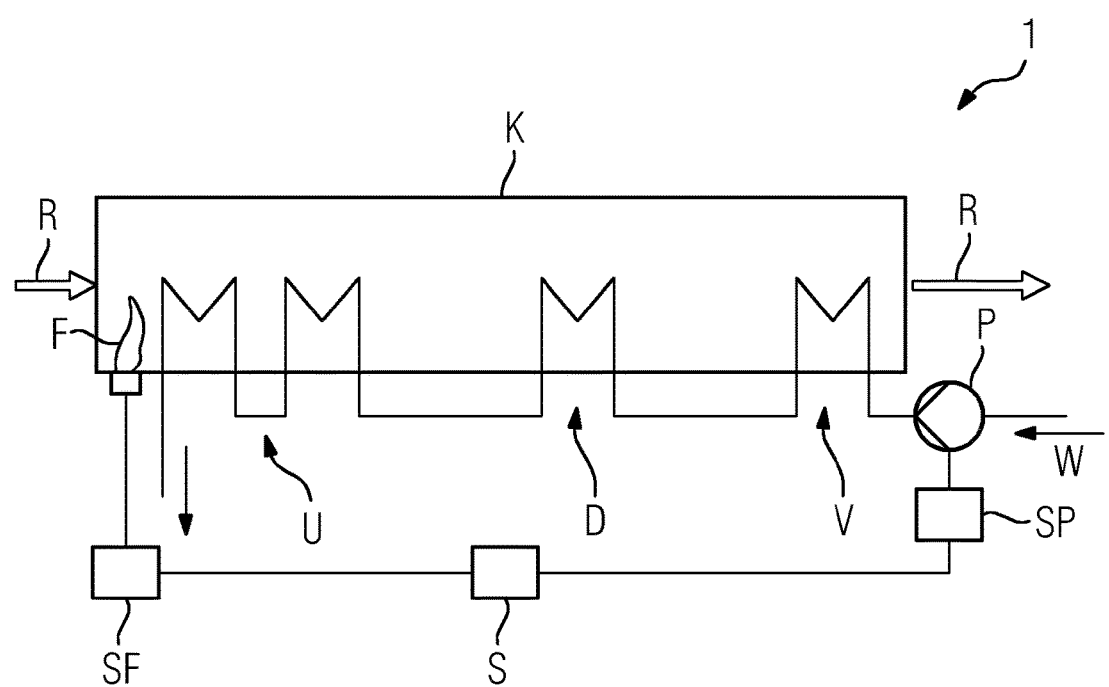

METHOD FOR THE FLEXIBLE OPERATION OF A POWER PLANT

CROSS-REFERENCE TO RELATED APPLICATIONS

This application claims priority to PCT Application No PCT/EP2013/070510 having a filing date of Oct. 2, 2013, based off of DE 102012218542.9 having a filing date of Oct. 11, 2012, the entire contents of which are hereby incorporated by reference.

FIELD OF TECHNOLOGY

The following relates to a method for the flexible operation of a power plant with a waste heat steam generator which works according to the once-through principle.

BACKGROUND

Modern power plants are required to be not only highly efficient but also as flexible as possible in operation. This includes, as well as short start-up times and high load-change speeds, also the possibility of equalizing frequency disturbances in the network. Depending on the requirement profiles of individual networks of different countries and the associated remuneration models, it can therefore be expedient, in particular in the case of combined gas and steam power plants, to make additional power available to the network as quickly as possible during peak load operation via the steam circuit by means of an additional firing. Such gas and steam power plants with additional firing are known for example from DE 10 2010 060 064 A1, EP 1 050 667 A1 and U.S. Pat. No. 3,980,100.

In currently known power plants with additional firing, generally use is made of drum-type boilers. Here, there is a noticeable delay between the additional firing being activated and the quantity of steam produced in the evaporator increasing. The improvement in the steam cooling of affected heating surface pipes, which cooling is directly coupled to the transient behavior of the steam production, is also delayed. In concrete terms, this means that, immediately at the point when the additional firing is switched on, superheater surfaces and reheater surfaces have to at first cope with the increasing heating on the flue gas side with approximately identical steam flow. Conversely, however, this also means that the fluid temperatures—and thus also the wall temperatures—of these heating surfaces can be held within permissible limits only by limiting the power increase of the additional firing. Such a requirement, however, substantially restricts the flexibility of the plant.

SUMMARY

An aspect relates to a method which overcomes the above-described drawbacks.

By using an additional firing, which is in particular arranged in the superheater/reheater region of the flue gas duct of the waste heat steam generator, the heat power transmitted to the steam circuit increases, which increases the quantity of steam generated and finally also the mechanical power delivered by the steam turbine. However, it is to be taken into account in this context that flue gas temperatures increase significantly in the flue gas duct in the vicinity of the additional firing which has been brought on-line. Especially the first heating surfaces downstream of the additional firing in the direction of the flue gas (these are generally the high-pressure superheater heating surfaces) are in these situations exposed to high thermal load. However, sufficient pipe cooling of these heating surfaces is essential if one is to ensure safe long-term operation. Finally, this pipe cooling is to be provided by means of the quantity of steam produced in the evaporator if one wishes to avoid the use of further components, such as additional injection coolers, which ensure sufficient pipe cooling of the corresponding heating surfaces in the flue gas duct. However, since the production of steam in the evaporator increases only with a noticeable delay after the additional firing is switched on, the superheater is exposed, at least immediately after the additional firing is brought on-line, to substantially greater heating while the pipe cooling properties remain largely the same, with all the resulting consequences.

It is therefore provided according to embodiments of the invention that, for the flexible operation of a power plant with a waste heat steam generator which works according to the once-through principle and has heating surfaces of various pressure stages of the waste heat steam generator arranged in the flue gas duct, in order to increase power at approximately the same time as an additional firing, arranged in the flue gas duct of the waste heat steam generator, is brought on-line, the mass flow rate of the feed water flowing through the heating surfaces is increased.

The core idea of the present invention lies in using the techno-physical advantage of once-through systems as compared to drum-type systems. Embodiments of the invention use the system properties of the once-through system which are not available to a system with drum-type evaporators. This system property represents a substantial advantage for power plants with waste heat steam generators with additional firing integrated in the flue gas duct, since the cooling of highly heated superheater heating surfaces can be actively influenced by controlling the feed water. Thus, in comparison to drum-type boilers, the once-through system which is in any case trimmed to flexible results, by virtue of the additional firing and the simultaneous feed water control which is matched thereto, in still greater plant flexibility. Furthermore, raising the steam mass flow rate lowers the relevant maximum temperature for the configuration of the superheater. This also allows the superheater arranged downstream of the additional firing to be fitted out with more cost-effective materials.

An advantageous development of the present invention relates to the inherent protection of the evaporator itself. Actively lowering the superheater baseline setpoint value at the evaporator outlet when the additional firing is switched on makes it possible to better withstand the greater heating of the evaporator pipes which results from the additional firing. Here, too, increasing the flow through the evaporator results in better pipe cooling. One possible form of a control particularly well suited thereto can be found in EP 2 194 320 A1.

If, after the additional firing is brought on-line, the actual superheating at the evaporator outlet is to be reduced even faster, or if the necessary increase in the steam mass flow rate does not result quickly enough in an improved cooling in particular of the superheater it is possible to provide an additional pilot control signal which further increases the feed water mass flow rate. Preferably, to that end, the power increase of the additional firing is evaluated by means of a DT1-derivative lag element and is added as an additional factor on the feed water quantity signal. In order that an additional signal is produced only in the case of transient processes of the additional firing—caused by the character of such a DT1-derivative lag element—this is not changed with the feed water mass flow rate signal in the case of deactivated additional firing or in the case of constant additional fire power.

BRIEF DESCRIPTION

Some of the embodiments will be described in detail, with reference to the following FIGURES, wherein like designations denote like members, wherein:

FIG. 1 schematically depicts an embodiment of a waste heat steam generator.

DETAILED DESCRIPTION

Embodiments of the invention will now be explained by way of example with reference to FIG. 1. The waste heat steam generator 1 depicted very schematically in FIG. 1 works according to the once-through principle. Such a waste heat steam generator usually has one or more preheater stages V, one or more evaporator stages D and one or more superheater stages U. The heating surfaces of the individual stages are arranged in a flue gas duct K such that the hot flue gas R issuing for example from a gas turbine flows first around the heating surfaces of the superheater stages U, then those of the evaporator stages D and finally those of the preheater stages V. In each stage there results a transfer of heat from the flue gas R to a medium flowing through the heating surfaces. With respect to a flow medium, a feed water pump P is connected upstream of the heating surfaces of the preheater stage V and the heating surfaces of the evaporator stage D are connected downstream thereof. The outlets of the heating surfaces of the evaporator stage D can be connected, with respect to the flow medium, via a water separator (not shown in more detail) to the downstream superheater heating surfaces U which, for their part, can be provided with injection coolers for adapting the temperature of the steam leaving the superheater heating surfaces.

In this case, the waste heat steam generator 1 is configured for a controlled charge of feed water W. To that end, the feed water pump P is controlled by means of a feed water quantity controller SP such that the quantity of feed water or the feed water mass flow rate urged by the feed water pump P towards the preheater V can be set by means of a suitable control. One possible form of such a feed water quantity controller SP can be found for example in EP 2 194 320 A1. In the exemplary embodiment shown here, the additional firing F is provided in the flue gas duct K in the region of the heating surfaces of the superheater U or other possible reheater heating surfaces. The additional firing F is controlled—and in particular switched on and off—by means of a corresponding additional firing power controller SF. In order to carry out the method according to embodiments of the invention, both the additional firing power controller SF for the additional firing F and the feed water quantity controller SP for the feed water pump P are accordingly controlled and monitored by a controller S such as a central control system of the power plant.

Once-through systems have the decisive advantage over circulating evaporators that, in normal operation, the flow medium is already superheated at the outlet of the evaporator. If according to the method according to embodiments of the invention the feed water mass flow rate is now simultaneously increased already when the additional firing is switched on, this results, in the case of a once-through evaporator, directly in a simultaneous rise in the steam mass flow rate. This takes place at the expense of the superheating, which is reduced by this measure. As the steam mass flow rate increases, the pipe cooling properties in the superheater are also simultaneously improved. It is thus possible, with a once-through system, for the superheater to be better cooled with increasing steam mass flow rates already when the additional firing is switched on. It is to be taken into account that, theoretically, the increase in the steam mass flow rate by increasing the quantity of feed water is only possible as long as the flow medium at the evaporator outlet has not yet reached the saturation temperature. If this is the case, any further increase in the feed water mass flow rate leads to a rise in the water produced in the bottle. Since, however, the extra heating of the additional firing can also be felt in the evaporator after a certain time delay, the reaching of the saturation temperature is counteracted from this side.

The idea of the present notification of embodiments of the invention now relates specifically to this techno-physical advantage of once-through systems. The additional firing is generally, on account of its property of worsening the overall efficiency of the plant, only switched on when the plant power has already reached 100% and additional power is to be made available at high remuneration conditions. The system is such that, at 100% plant load, the highest superheating is at the evaporator outlet of waste heat steam generators 1 with BENSON evaporators. In current configurations, this is between approximately 40 K and 50 K. If, now, when the additional firing F is switched on, the superheating baseline setpoint value of the evaporator D in the feed water setpoint value determining of such once-through waste heat steam generators is simultaneously reduced to its minimum value (typically 10 K) within a very short time, then on account of this measure the quantity of feed water flowing through the evaporator increases. The feed water control attempts to set the new superheating setpoint value by means of an increased feed. Simultaneously, the steam mass flow rate leaving the evaporator also increases, which steam mass flow rate improves the cooling properties of the superheater stage U which is highly loaded because of the additional firing. The cooling effect in the superheater is even further increased by virtue of the fact that the superheating at the evaporator outlet has been reduced by the now increased quantity of feed water. Since a minimum superheating baseline setpoint value of 10 K maintains a sufficient margin with respect to the bubble-point curve, production of water in the water separator need not be taken into account even in the case of minor undershoots of the actual superheating at the evaporator outlet. This is further supported by the fact that, as a result of the increasing heating of the evaporator due to the additional firing F, the actual superheating at the evaporator outlet tends to climb further.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for the flexible operation of a power plant, the power plant including a waste heat steam generator that works according to a once-through principle and has a plurality of heating surfaces of various stages of the waste heat steam generator arranged in a flue gas duct, the method comprising:

increasing power of the power plant by using an additional firing power controller controlling an additional firing within the flue gas duct at approximately the same time as a mass flow rate of a feed water flowing through the plurality of heating surfaces is increased by controlling a feed water quantity controller controlling a feed water pump, the additional firing power controller and the feed water quantity controller both being controlled and monitored by a central control system, wherein the additional firing is located at a flue gas entry side of the flue gas duct;

wherein the feed water flows in a feed water direction towards the flue gas entry side of the flue gas duct starting proximate a flue gas exit side of the flue gas duct through the plurality of heating surfaces a single time according to the once-through principle;

wherein a flue gas flows from the flue gas entry side of the flue gas duct and around the plurality of heating surfaces, such that the flue gas first passes around one or more superheater stages, then around one or more evaporator stages, and then around one or more preheater stages, in a flow direction opposite to a flow direction of the feed water.

2. The method as claimed in claim 1, wherein the feed water mass flow rate is increased by reducing a superheating baseline setpoint value at an outlet of an evaporator stage of the various stages of the waste heat steam generator.

3. The method as claimed in claim 1, wherein in addition a change in power of the additional firing is evaluated and is acted upon as a correction factor for an increase in the feed water mass flow rate.

4. The method as claimed in claim 1, wherein cooling properties of a superheater stage of the various stages of the waste heat steam generator is improved and a larger quantity of steam is generated.

5. The method as claimed in claim 1, wherein the superheater stage is arranged proximate the additional firing.

6. The method as claimed in claim 1, wherein the feed water is already superheated at an outlet of an evaporator of the plurality of heating surfaces.

7. The method as claimed in claim 1, wherein a cooling of a superheater of the plurality of heating surfaces is actively influenced by controlling the feed water flowing through the plurality of heating surfaces according to the once-through principle.

8. A method for flexible operation of a power plant having a waste heat steam generator that works according to a once-through principle, the waste heat steam generator including a plurality of heating surfaces of various stages of the waste heat steam generator arranged in a flue gas duct, the method comprising:

switching on an additional firing that is arranged in the flue gas duct; and increasing a mass flow rate of a feed water flowing through the plurality of heating surfaces by controlling a feed water quantity controller controlling a feed water pump when the additional firing is switched on using an additional firing power controller controlling to increase a steam mass flow rate that:

actively controls a cooling of one or more superheater heating surfaces of the plurality of heating surfaces within the flue gas duct, and generates a larger quantity of steam to be delivered;

wherein the feed water flows in a feed water direction towards a flue gas entry side of the flue gas duct starting proximate a flue gas exit side of the flue gas duct through the plurality of heating surfaces a single time according to the once-through principle;

wherein a flue gas flows from the flue gas entry side of the flue gas duct and around the plurality of heating surfaces, such that the flue gas first passes around one or more superheater stages, then around one or more evaporator stages, and then around one or more preheater stages, in a flow direction opposite to a flow direction of the feed water;

the additional firing power controller and the feed water quantity controller both being controlled and monitored by a central control system.

* * * * *